(12) United States Patent
Hugg et al.

(10) Patent No.: US 10,371,832 B1
(45) Date of Patent: Aug. 6, 2019

(54) THERANOSTIC IMAGING WITH CZT GAMMA CAMERAS

(71) Applicant: KROMEK GROUP, PLC

(72) Inventors: James William Hugg, Mars, PA (US); Ian Radley, Durham (GB)

(73) Assignee: KROMEK GROUP, PLC, Sedgefield, County Durham (GB)

( * ) Notice: Subject to any disclaimer, the term of this patent is extended or adjusted under 35 U.S.C. 154(b) by 0 days.

(21) Appl. No.: 16/116,430

(22) Filed: Aug. 29, 2018

(51) Int. Cl.
  *G01T 1/20* (2006.01)
  *G01T 1/202* (2006.01)
(52) U.S. Cl.
  CPC .......... *G01T 1/2023* (2013.01); *G01T 1/2018* (2013.01)
(58) Field of Classification Search
  CPC .................... G01T 1/2023; G01T 1/2018
  See application file for complete search history.

(56) References Cited

U.S. PATENT DOCUMENTS

| | | | | |
|---|---|---|---|---|
| 6,353,227 B1* | 3/2002 | Boxen | .................... | G21K 1/025 250/363.06 |
| 9,482,764 B1* | 11/2016 | Shahar | .................... | G01T 7/005 |
| 2010/0104505 A1* | 4/2010 | O'Connor | ............ | A61B 6/0414 424/1.11 |
| 2013/0161520 A1* | 6/2013 | Jansen | .................. | A61B 6/037 250/363.1 |
| 2014/0218720 A1* | 8/2014 | Kindem | ............... | A61B 6/4258 356/72 |

* cited by examiner

*Primary Examiner* — Hugh Maupin
(74) *Attorney, Agent, or Firm* — Ference & Associates LLC

(57) ABSTRACT

One embodiment provides a method for imaging photons, including: receiving a dataset associated with a plurality of photon events, the photon events corresponding to photons interacting with a photon imaging device, wherein the photon imaging device comprises a photon guide assembly and a detector array; the photon guide assembly comprising a plurality of photon guides positioned at an oblique angle with respect to the detector array; and producing an oblique planar projection image of the plurality of photon events by processing the dataset. Other aspects are described and claimed.

20 Claims, 7 Drawing Sheets

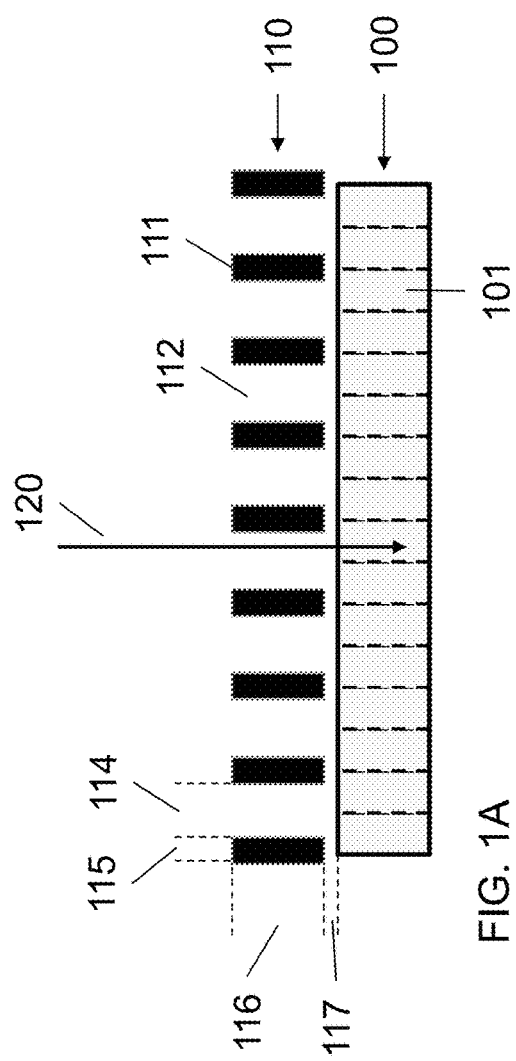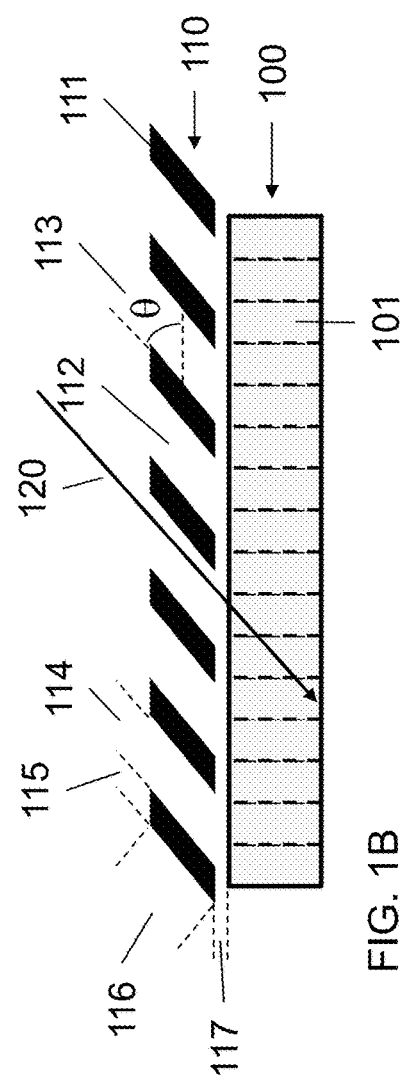

THERANOSTIC IMAGING WITH CZT GAMMA CAMERAS

BACKGROUND

Imaging devices perform many different functions such as medical imaging, security screening, image capture, or the like. The source of the imaging may be a radiological source, visible light, non-visible light, or any type of source for which the imaging device is capable of detection. For example, in a medical setting, a patient may be injected with a radiopharmaceutical tracer agent and the imaging device may capture the emission of gamma photon radiation from the patient's body for diagnostic analysis. The imaging device may include a gamma camera sensitive to the emission source, for example, a camera including a specific substance or object that is sensitive to or reacts to the emission source. The camera may contain individual pixels which may allow the imaging source to determine the location, energy, timing, and intensity of the emitted signal. The term "theranostics" is a portmanteau word comprising "therapeutics" and "diagnostics" coined in 2002. Theranostics has become a new field of medicine which combines specific targeted therapy based on specific targeted diagnostic tests. An example of combining diagnostic and therapeutic capabilities into a single photon emission imaging agent is $^{131}$I-mIBG for thyroid cancer.

BRIEF SUMMARY

In summary, one aspect provides a method for imaging photons, comprising: receiving a dataset associated with a plurality of photon events, the photon events corresponding to photons interacting with a photon imaging device, wherein the photon imaging device comprises a photon guide assembly and a detector array; the photon guide assembly comprising a plurality of photon guides positioned at an oblique angle with respect to the detector array; and producing an oblique planar projection image of the plurality of photon events by processing the dataset.

Another aspect provides a photon imaging device, comprising: a photon imaging device, wherein the photon imaging device comprises a photon guide assembly and a detector array; a photon guide assembly comprising a plurality of photon guides positioned at an oblique angle with respect to the detector array; and a processor; a memory device that stores instructions executable by the processor to: receive a dataset associated with a plurality of photon events, the photon events corresponding to photons interacting with the photon imaging device; and producing an oblique planar projection image of the plurality of photon events by processing the dataset.

A further aspect provides a product, comprising: a storage device that stores code, the code being executable by a processor and comprising: code that receives a dataset associated with a plurality of photon events, the photon events corresponding to photons interacting with a photon imaging device, wherein the photon imaging device comprises a photon guide assembly and a detector array; the photon guide assembly comprising a plurality of photon guides positioned at an oblique angle with respect to the detector array; and code that produces an oblique planar projection image of the plurality of photon events by processing the dataset.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

FIG. 1A illustrates an embodiment of the method for theranostic imaging with CZT.

FIG. 1B illustrates an embodiment of the method for theranostic imaging with CZT.

DETAILED DESCRIPTION

Figure 1C:
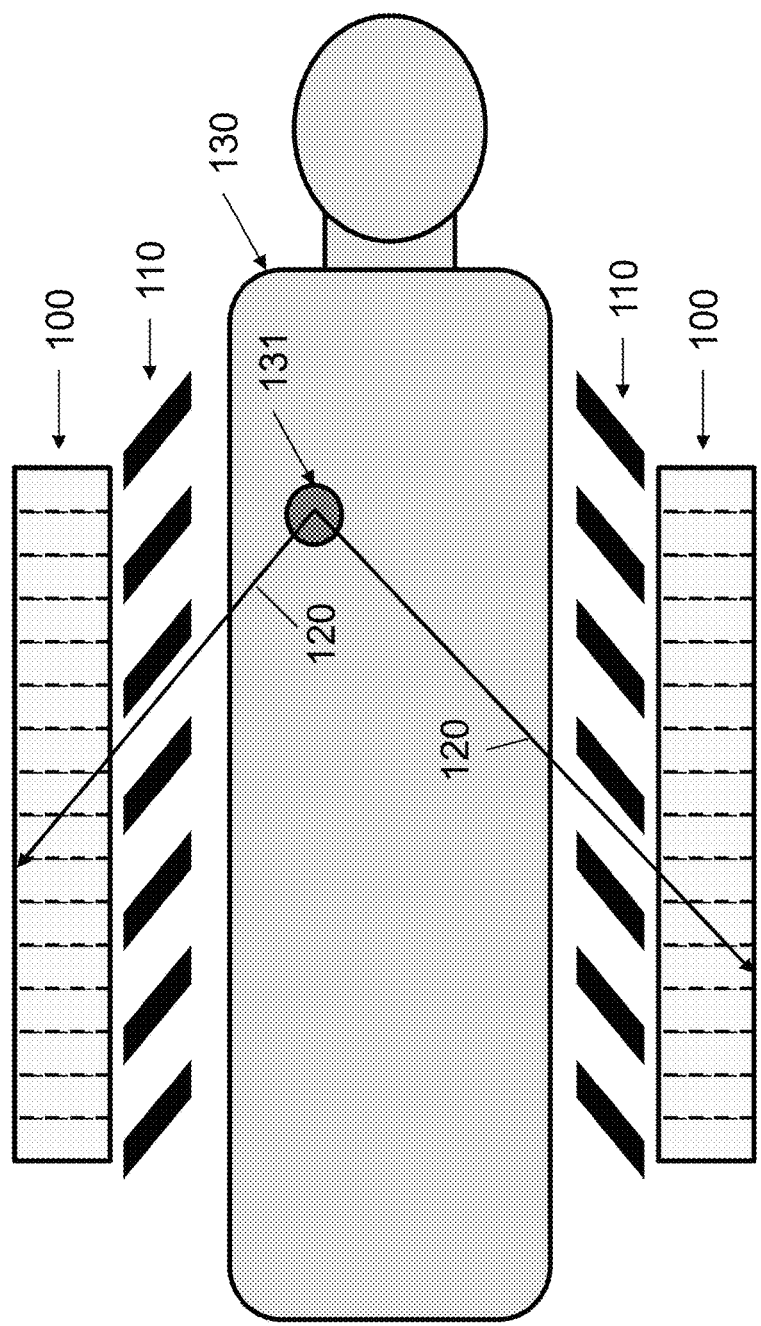
FIG. 1C illustrates an embodiment of the method for theranostic imaging with CZT.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users of imaging devices often desire image output of a high spatial, temporal, and energy resolution. For example, a medical image having high spatial, temporal, and energy resolution may influence a patient's care by directing a physician to a location of interest within the patient's body. Many imaging devices utilize a camera sensitive to the type of emission being imaged to accurately capture an image. The camera image may be divided into discrete areas or picture elements (pixels), where each pixel may represent a location, an energy spectrum, and an intensity within the image captured.

By way of illustration, in a nuclear medicine (molecular imaging) setting, a patient may be injected with a radiopharmaceutical tracer agent and the imaging device (gamma camera) may capture the emission of gamma photon radiation from the patient's body for diagnostic analysis. The detectors in a gamma camera may comprise a scintillator with coupled photon detectors (for example, photomultiplier tubes) or may comprise semiconductor direct-conversion materials such as CdZnTe (CZT), CdTe, HgI, and Si. A gamma photon detector pixel array comprising a semiconductor direct-conversion detector material has advantages over scintillator plus photon detector gamma cameras, including superior energy and spatial resolution, both of which contribute benefits for theranostic imaging.

What is needed for theranostics is a gamma camera that performs well for both diagnostic imaging applications and therapeutic monitoring applications. By way of example, we will consider the common nuclear medicine treatment for thyroid cancer that uses $^{131}$I-mIBG or other radiopharmaceutical agents to ablate thyroid tissue remaining after surgical resection of cancerous thyroid glands. For diagnostic purposes the thyroid uptake of iodine can be imaged with a different isotope $^{123}$I-mIBG (153 keV gamma emission) for which a standard general-purpose SPECT or thyroid-specific gamma camera is well suited, in as much as the stopping power (photon absorption by detector) for standard 9.5 mm NaI (82%) or 5 mm CZT (75%) is adequate for efficient imaging. However, the therapeutic $^{131}$I-mIBG (364 keV gamma emission) is much higher in energy and the same standard-thickness gamma cameras only stop 35% for NaI and 29% for CZT of the high-energy gamma photons. We describe a novel, inventive solution for this challenge that will find immediate clinical application in theranostic imaging with CZT gamma cameras. The solution described herein may be used in a medical setting to reduce imaging time, improve diagnosis, lower costs, improve patient outcomes, and provide better imaging data to healthcare professionals.

Accordingly, an embodiment provides use of a parallel slant-hole collimator assembly to select obliquely incident gamma photons with a longer maximum path length in the CZT detector, thus increasing the stopping power (absorption) and, therefore, the detection efficiency. Other methods of improving the performance of the CZT detectors for theranostic isotopes, such as $^{131}$I, are described and disclosed.

Such systems and methods provide a technical improvement to current imaging techniques. These improvements may be important for medical imaging, lower patient dosing of imaging reagents, reduce exam/procedure time, or the like.

The illustrated example embodiments will be best understood by reference to the figures. The following description is intended only by way of example, and simply illustrates certain example embodiments.

Referring now to FIG. 1, an embodiment of an imaging device and method may be in a healthcare setting, security screening, manufacturing, or any application where an imaging device may be utilized. For example, the imaging device may be a radiological imaging device in which either photons are transmitted through or radioactive imaging agents are introduced into (injection, inhalation, ingestion) and then photons are emitted from a patient's body. Another example may include an airport or port of entry device used to scan for radiation or other material of interest for security purposes. Another example of an imaging device may be used by first responder to determine environmental conditions and/or safety of a location. Other uses are contemplated and disclosed.

An embodiment may acquire one or more projection images of photon emissions. Acquiring an image may comprise receiving or capturing a communication event occurring within a photon detector pixel array. Receiving or capturing an interaction may include receiving one or more signals from one or more pixel detection units that indicate an interaction has occurred. For readability, the discussion herein will refer to a photon as that object which is causing the interaction and resulting in the signals. However, it should be understood that the object may include a photon (light of any spectrum), a radiological particle, or any type of energy which the detection unit is capable of detecting. A photon detector pixel array may comprise one or more pixel-detector units. A photon detector pixel array may be organized in any configuration such as a grid, a brick pattern, an interspersed pattern, or the like. The photon detector pixel array may be oriented in a flat plane, curved plane, or the like. In other words, the photon detector pixel array may be arranged in a manner that is suitable for detecting interactions from an emission source and may be different for different applications. For example, a photon from an emission source may interact with one or more pixels on a photon pixel array as part of an imaging unit in a medical setting. A plurality of projection images is acquired in SPECT imaging. For example, in a system 310 such as that depicted in FIG. 3, the gantry may rotate 6 degrees between each set of two projection images (one for each gamma camera 318) until a total of 60 projection images have been acquired. Each of these projection images may be processed to make corrections for attenuation and/or scatter before being further processed to reconstruct a 3D image of the patient's body, particularly showing the distribution of an injected (or ingested or inhaled) radioisotope tracer.

In an embodiment a pixel (picture element) refers to a discrete location on the imaging hardware surface that may be only a subset of the imaged area. The data or electronic communication from a pixel or plurality of pixels may be used to form an image as a composite from the one or more pixels. An imaging device may use many methods to detect a communication event from a pixel. For example, in a consumer camera a pixel represents the location, intensity, and wavelength (energy) of the visible light detected by the pixel. As another example, radiological imaging devices used in cancer screenings, radiation detectors, and the like, use a type of atomic particle or photon emitted by a source and measurable by a sensor with associated circuitry to provide both a location, energy, and intensity (or count density) of the radiological particles or photons detected. Using the communication events from the pixels, an image may be created based upon the location, intensity, and energy or wavelength of the communication event from the pixel. In other words, an embodiment may use the signal transmitted from the pixel during imaging to create an image based upon the information contained within the signal. The data may be collected from multiple pixels to create an image of a larger area.

In an embodiment illustrated schematically in FIG. 1 with a semiconductor detector material 100, a photon detector pixel array may have two sides with metallic electrodes deposited on the semiconductor detector crystal. A first side (bottom in this drawing) may comprise a plurality of pixels 101, also referred to as the pixelated side, which may be arranged in a grid pattern. This side may be coupled to read-out electronics (not shown for simplicity) that can capture the signal from the pixelated side. In the case of CdZnTe (CZT) or CdTe, in which the electron mobility is much larger than hole mobility, the pixelated side may be the anode side of the array and provide anode signals. In some configurations, this side may be connected to ground potential. In an embodiment, a second side (top in this drawing) of the detector pixel array may be substantially opposite the first side, for example, in the case of a thick sheet-like detector, the first side may be the bottom side, and the second side may be the top side, typically the side from which gamma photons 120 may be incident upon the detector. This second side of the detector pixel array may be a cathode and may be connected to a negative voltage bias.

In FIG. 1 the individual pixels 101 are illustrated by vertical dashed lines in the slab of CZT crystal 100. By way of example, the pixels 101 may be square with a pixel pitch of 1.0 to 2.5 mm for clinical applications and the thickness of the CZT detector may be 5 mm. To form a focused image, a gamma camera 318 needs a collimator assembly 317 or 110 as illustrated in FIG. 1 by the array of black-filled bars 111. The illustration in FIG. 1a represents a parallel-hole collimator assembly which may have an array of hexagonal or square shaped holes 112. The septa 111 may be typically made of lead (Pb) or tungsten (W). The performance of the collimator, in terms of efficiency (sensitivity), spatial resolution, and septal penetration is determined by a few geometric parameters of the collimator design: the diameter of the hole 114, the material and thickness of the septa 115, the length of the septa (and holes) 116, and the separation 117 between the collimator 110 and gamma detector 100. As one skilled in the art will recognize, there are well-established textbook formulas that predict collimator performance based upon these parameters. There are also additional types of collimator assemblies comprising parallel-hole (as in FIG. 1a), parallel slant-hole (as in FIG. 1b), focused-hole, slit-slat, rotating slat, multiple-pinhole, coded-aperture, and Compton-scatter collimators.

As will be discussed in more detail with regards to FIG. 2, a standard 5 mm thick CZT detector is not thick enough to efficiently image therapeutic $^{131}$I (364 keV). The obvious solution is to use thicker CZT, for example 7 mm thick. The major problem with this obvious solution is that CZT is expensive and makes up a significant fraction of the cost of a gamma camera. If the cost of CZT scaled linearly with volume, the cost of 7 mm thick CZT detectors would be 40% more than the cost of 5 mm thick CZT detectors. The actual cost may scale faster than linear. What is needed is a novel solution that is not obvious.

FIG. 1b illustrates such a solution. The same elements are found in FIG. 1b as in 1a. However, the parallel-hole collimator assembly 110 in FIG. 1b is slanted at an angle θ 113. The pixelated 101 CZT detector 100 is unchanged. The parallel slant-hole collimator assembly 110 in FIG. 1b restricts the incident gamma photons 120 that impinge upon the detector 100 to a small solid-angle range around the slant angle 113. The non-obvious effect is that the incident photons now have a longer maximum path length in the CZT detector and are more likely to be stopped and detected. Thus, the effect is to increase the efficiency (sensitivity) of the detector. In fact, as will be discussed with regard to FIG. 2, a slant angle 113 increases the maximum path length L according to the formula $L=T/\cos(\theta)$, where T is the thickness of the detector 100. If T=5 mm and θ=45°, then L=7.1 mm. This geometric boost in efficiency, due to longer maximum path length and, thus, greater stopping power at oblique incidence angles means that a thicker, more expensive detector can be avoided by using a parallel slant-hole collimator and adjusting the image reconstruction algorithm to account for the different collimator-detector response. It should be noted that the overall system efficiency is a convolution of the collimator and detector resolutions. The benefit of the increased detector efficiency at oblique photon incidence angles could be lost if the parallel slant-hole collimator is not designed to consider the tradeoff between efficiency and spatial resolution.

It will be recognized by those skilled in the art that there are other collimation embodiments based on the principal of using oblique incidence photon trajectories to benefit from the higher stopping power of a longer maximum path length in the detector. For example, an embodiment may utilize one or more pinhole apertures. In general, pinhole apertures will allow obliquely incident photons to impact the detector. Furthermore, the central axis of a pinhole can be oblique to the normal vector (perpendicular to the surface plane) of the detector, in which case the distribution of incident photon directions will be skewed toward the oblique central axis. Another embodiment may use an obliquely slanted coded aperture collimator, or a focused collimator (converging or diverging).

There are some additional considerations that must be addressed to effectively use oblique incidence gamma photons 120 with a pixelated CZT detector 100. First, notice in FIG. 1a that the path of the incident photon 120 is confined to a single pixel 101. This is a simplification, as those with skill in the art will recognize. There are several mechanisms for spreading the signal of an incident photon 120 into neighboring pixels 101. The interaction of the gamma photon 120 with the CZT detector 100 produces a charge cloud comprising electrons and holes. The bias voltage applied to the cathode (typically about −100 V/mm) generates an electric field that accelerates electrons toward the ground potential pixelated anodes (bottom surface in FIG. 1) and the holes toward the negative potential cathode (top surface in FIG. 1). If the interaction occurs near the edge of a pixel 101, then the charge cloud may overlap with the neighboring pixel 101 and the charge may be shared. It is also possible that the photon 120 will Compton scatter once or several times before having its remaining energy transferred in a photoelectric interaction. Those Compton scattering events may cause the photon 120 energy to be shared between two or more pixels. In an embodiment of this invention, the charge sharing between neighboring pixels may be corrected to improve the photopeak efficiency of the CZT detector 100. Corrections may be made for multiple Compton scattering events as well as charge cloud sharing, as described in detail in U.S. patent application Ser. No. 15/922,598 filed 15 Mar. 2018.

A second consideration is illustrated in FIG. 1b where the path of the obliquely incident photon 120 traverses multiple pixels 101. As those skilled in the art will recognize, a parallax error may be introduced by this geometry. As illustrated in FIG. 2b, three different pixels 101 are traversed by the path of the obliquely incident photon 120. Most of the interaction energy may be deposited in any one of these three pixels 101, which may in turn share some of the charge cloud with neighboring pixels. The position for the photon 120 may be assigned correctly if the interaction occurs close to the cathode (top surface of CZT detector 100), but incorrectly if the interaction occurs close to pixelated anode (bottom surface of CZT detector 100). This parallax error results in image blurring. An embodiment of this invention avoids the parallax problem by estimating the depth-ofinteraction as described in detail in commonly owned U.S. patent application Ser. No. 15/922,598 filed 15 Mar. 2018. Thus, another advantage of CZT detectors over scintillator detectors is the capability of measuring depth-of-interaction.

Figure 3:
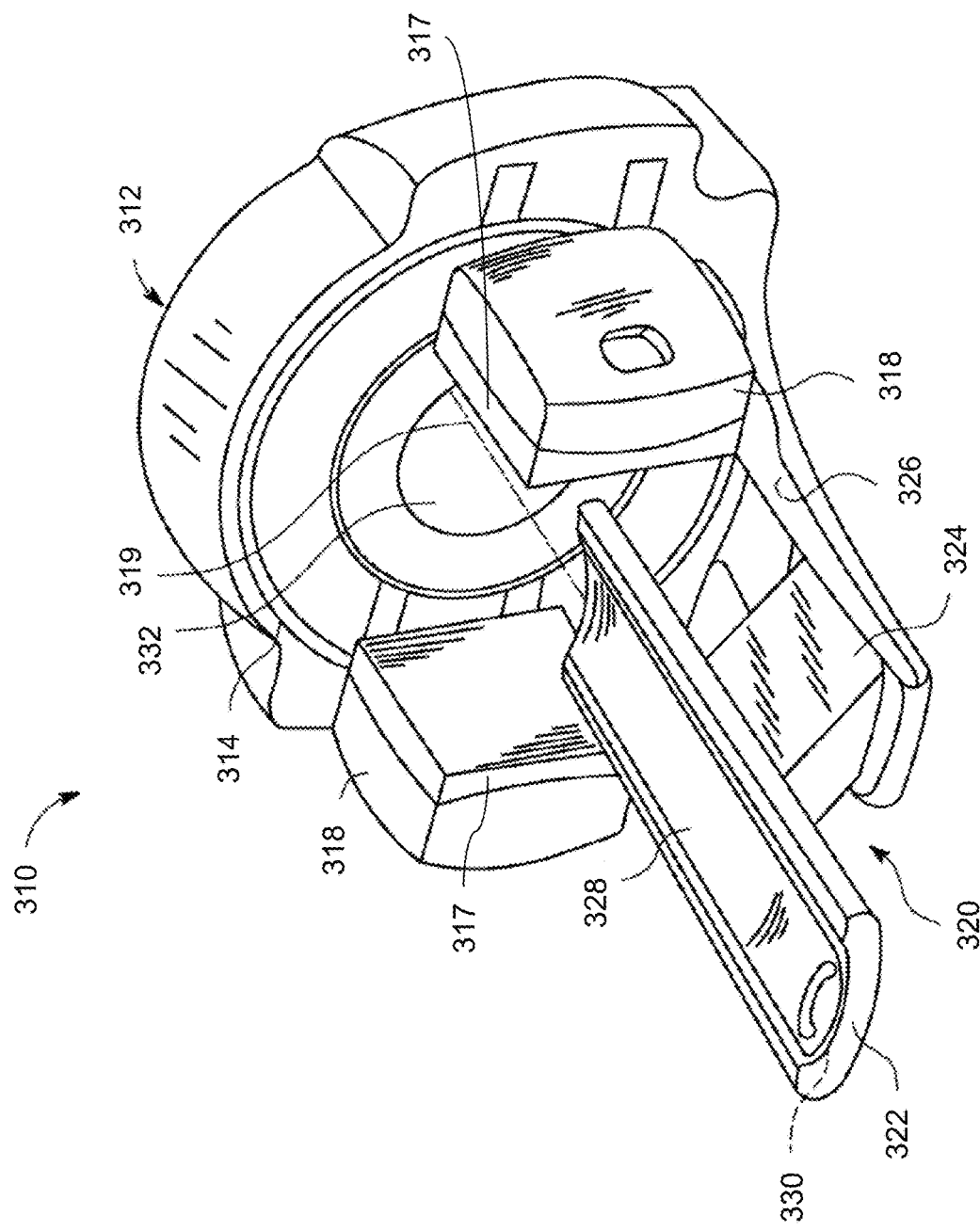
FIG. 3 illustrates another embodiment of an imaging device that may use the disclosed embodiments.

An embodiment of this invention will work well with only the application of the parallel slant-hole collimator assembly 110 of FIG. 1b. However, embodiments that include neighbor charge-sharing corrections and/or depth of interaction estimation will exhibit improved performance. There is a further benefit of this invention that results from the fact that almost all SPECT imaging systems comprise two or more gamma cameras. Consider the more common configuration of two gamma cameras directly opposed by 180 degrees on either side of a patient, as illustrated in FIG. 1c or FIG. 3. If both gamma cameras (100 or 318) are deployed with parallel slant-hole collimator assemblies (110 or 317) pointing in the same direction, then a stereo image is recorded. A patient 130 may have an organ or lesion 131 comprising a concentration of radioactive tracer that emits gamma photons 120 in all directions. The parallel slant-hole collimators 110 allow a narrow solid-angular range of gamma photons 120 to impinge upon the detectors 100. The 2D projection image of the organ or lesion 131 on each detector 100 depends upon the 3D position of the detectors with respect to the organ or lesion 131. The pair of images has depth information encoded in the 2D projection image displacements selected by the slanted collimator holes. The image reconstruction software may take this stereo information into account to improve on the 3-dimensional image of the radioisotope distribution in the patient's body. In fact, with only a single projection angle (that is planar images, rather than SPECT images at multiple projection angles) a stereotactic image reconstruction will contain significant 3D information.

The various embodiments described herein thus represent a technical improvement to imaging devices that may require high sensitivity and resolution to the material imaged. Using the techniques described herein, the detection efficiency of the system can be substantially improved, so that rather than requiring longer imaging sessions and/or higher radiological doses, a more complete image may be achieved with lower imaging session durations and/or lower radiological doses.

Figure 2:
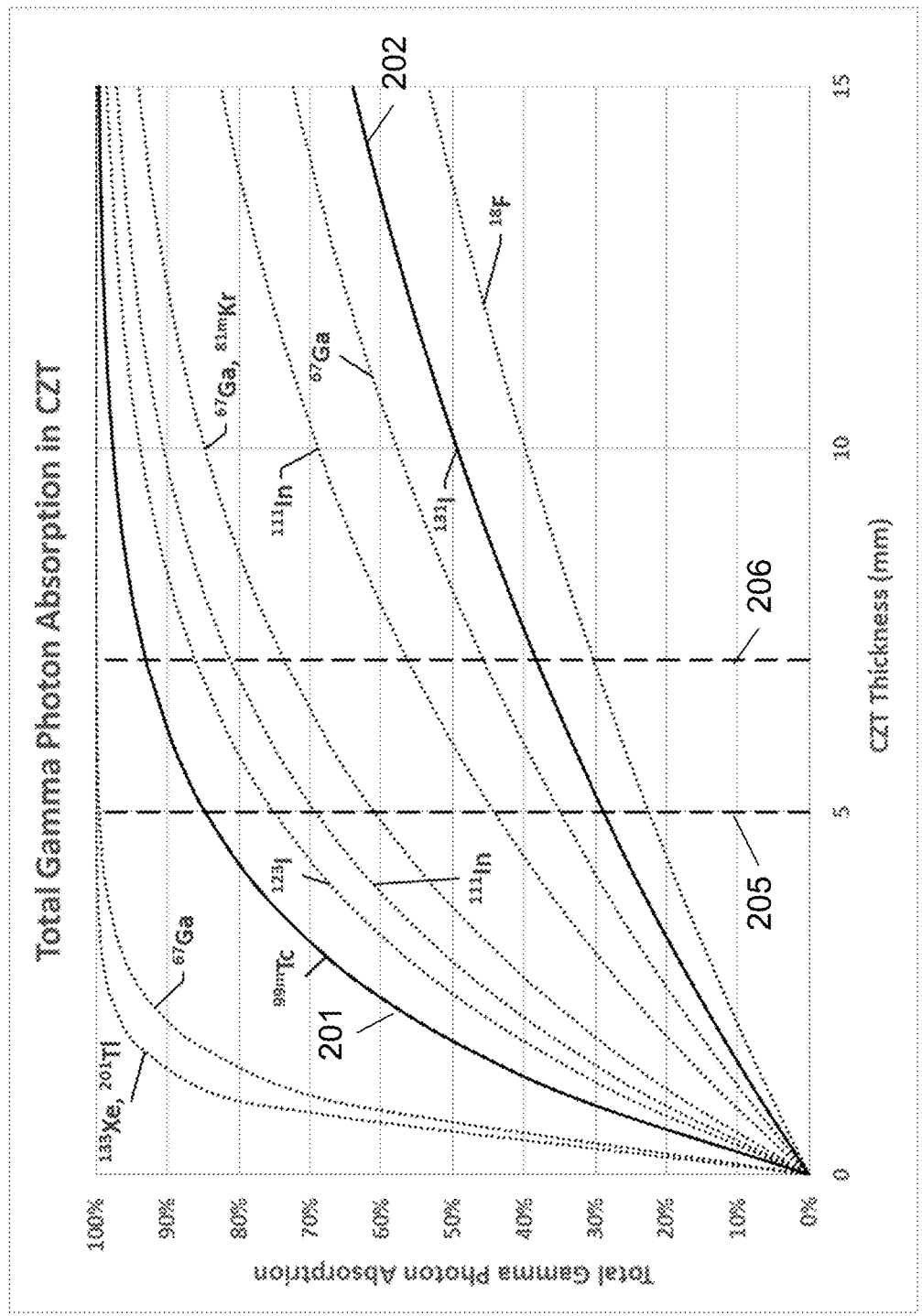
FIG. 2 illustrates a further aspect of an embodiment of the method for theranostic imaging with CZT.

Referring now to FIG. 2, we can quantify one aspect of the efficiency improvement realized by an embodiment of this invention. The graph 200 shows the total gamma photon absorption by a CZT detector of various thicknesses ranging from 0 to 15 mm. A typical thickness for medical diagnostic imaging applications is 5 mm. The most commonly used imaging isotope is $^{99m}$Tc (140 keV gamma emission) as depicted by the solid curve 201. Total absorption includes both photoelectric and Compton scatter mechanisms for gamma-CZT interaction. The most commonly used therapeutic isotope is $^{131}$I (364 keV gamma emission) as depicted by the other solid curve 202. Other medical imaging isotopes are plotted with dotted curves. There are two particular thicknesses of CZT called out for comparison: 5 mm (dashed vertical line 205) and 7.1 mm (dashed vertical line 206). These values are shown because 5 mm is a standard thickness for medical application CZT detectors and, as in a previous example, if T=5 mm and the slant angle (113) is θ=45°, then L=7.1 mm, where L is the maximum gamma photon path length. The following TABLE lists the gamma emission energies and medical imaging isotopes included in FIG. 2, the fraction of photoelectric and Compton interactions in CZT for the various gamma photon energies, and three stopping powers (% total gamma photon absorption) for 5 mm and 7.1 mm CZT and, for comparison, standard 9.5 mm NaI scintillator as used in most gamma cameras.

| Energy (keV) | Isotope | % Photo-electric in CZT | % Compton in CZT | % stopped by 5 mm CZT | % stopped by 7.1 mm CZT | % stopped by 9.5 mm NaI |
|---|---|---|---|---|---|---|
| 69-83 | $^{133}$Xe, $^{201}$Tl | 96 | 4 | 100.0 | 100.0 | 100.0 |
| 93 | $^{67}$Ga | 94 | 6 | 99.6 | 100.0 | 99.9 |
| 140 | $^{99m}$Tc | 84 | 16 | 84.8 | 93.0 | 90.3 |
| 159 | $^{123}$I | 79 | 21 | 75.1 | 86.0 | 82.2 |
| 71 | $^{111}$In | 75 | 25 | 69.3 | 81.2 | 76.9 |
| 185, 190 | $^{67}$Ga, $^{81m}$Kr | 70 | 30 | 61.0 | 73.6 | 68.9 |
| 245 | $^{111}$In | 54 | 46 | 44.2 | 56.2 | 51.6 |
| 300 | $^{67}$Ga | 42 | 58 | 35.0 | 45.6 | 41.4 |
| 364 | $^{131}$I | 31 | 69 | 28.9 | 38.2 | 34.5 |
| 511 | $^{18}$F | 18 | 82 | 22.4 | 30.2 | 26.6 |

The 7.1 mm CZT column represents the capability of the current invention for a collimator slant angle (113) of 45 degrees. Comparing this column with the stopping powers for 9.5 mm NaI scintillator shows that the CZT gamma detector could be more efficient than a NaI detector. To match the NaI performance, a slant angle of about 37 degrees could be used. As one skilled in the art will recognize, both the collimator and the gamma photon detector contribute to the detection efficiency, so a complete analysis would require that the collimator designs be considered as well.

Referring to FIG. 3, the pixelated detectors and/or gamma cameras of the various embodiments may be provided as part of different types of imaging systems, for example, nuclear medicine (NM) imaging systems such as positron emission tomography (PET) imaging systems, single-photon emission computed tomography (SPECT) imaging systems and/or x-ray imaging systems and x-ray computed tomography (CT) imaging systems, among others. For example, FIG. 3 is a perspective view of an exemplary embodiment of a medical imaging system 310 constructed in accordance with various embodiments, which in this exemplary embodiment is a SPECT imaging system. The system 310 includes an integrated gantry 312 that further includes a rotor 314 oriented about a gantry central bore 332. The rotor 314 is configured to support one or more NM pixelated cameras 318 and associated collimator assemblies 317 (two cameras 318 and two collimators 317 are shown), such as, but not limited to gamma cameras, SPECT detectors, multi-layer pixelated cameras (e.g., Compton camera) and/or PET detectors. It should be noted that when the medical imaging system 310 includes a CT camera or an x-ray camera, the medical imaging system 310 also includes an x-ray tube (not shown) for emitting x-ray radiation towards the detector (318 or a separate x-ray detector not shown). In various embodiments, the cameras 318 are formed from pixelated detectors as described in more detail herein. The rotor 314 is further configured to rotate axially about an examination axis 319.

A patient table 320 may include a bed 322 slidingly coupled to a bed support system 324, which may be coupled directly to a floor or may be coupled to the gantry 312 through a base 326 coupled mechanically to the gantry 312. The bed 322 may include a stretcher 328 slidingly coupled to an upper surface 330 of the bed 322. The patient table 320 is configured to facilitate ingress and egress of a patient (not shown) into an examination position that is substantially aligned with examination axis 319 and in which the patient is positioned in the field of view of the gamma cameras 318. During an imaging scan, the patient table 320 may be controlled to move the bed 322 and/or stretcher 328 axially into and out of a bore 332. The operation and control of the imaging system 310 may be performed in any manner known in the art. It should be noted that the various embodiments may be implemented in connection with imaging systems that include rotating gantries or stationary gantries.

Figure 4:
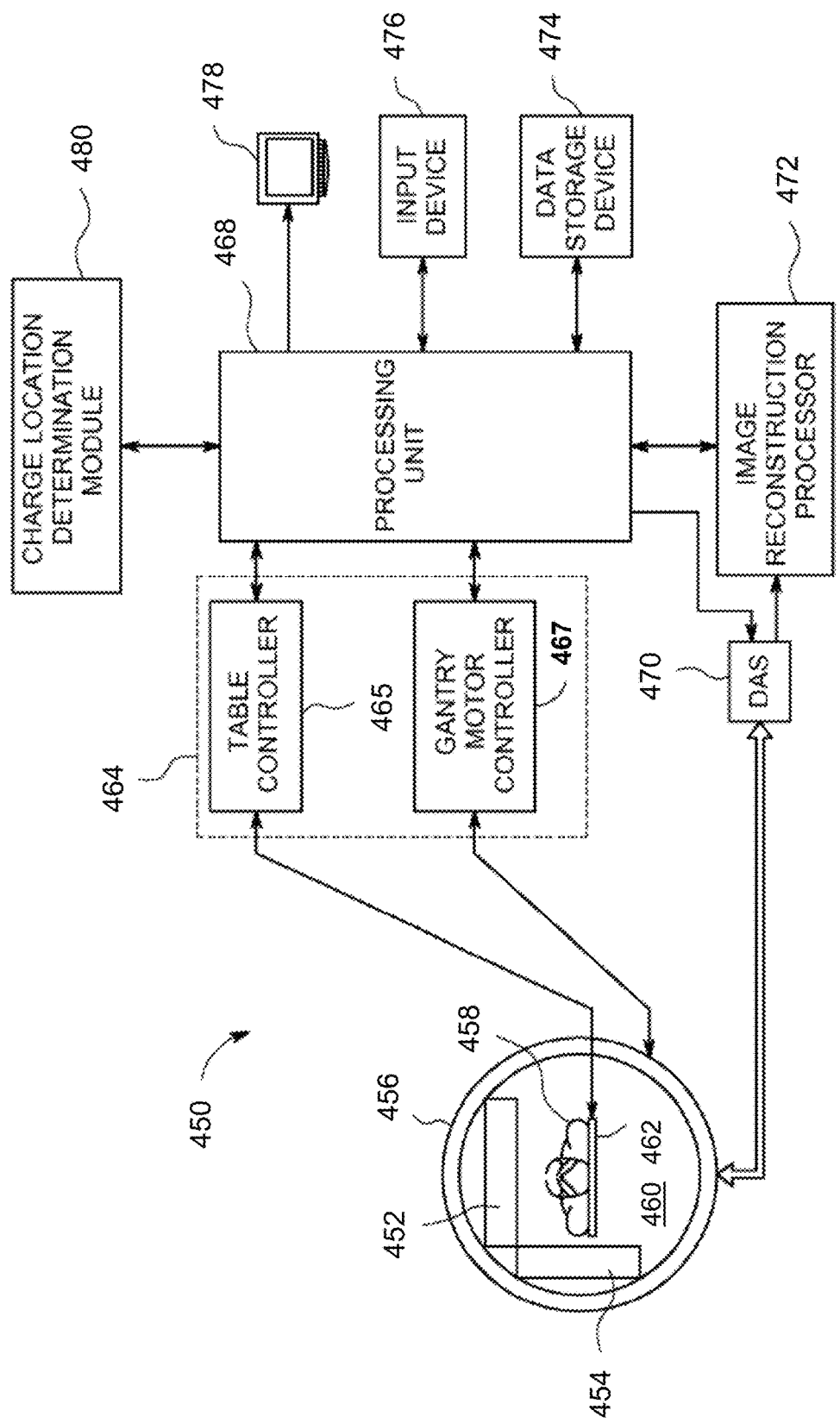
FIG. 4 illustrates a further example of information handling device circuitry for the example imaging device of FIG. 3 that may use the disclosed embodiments.

Referring now to FIG. 4 which illustrates a block diagram illustrating an imaging system 450 that has a plurality of pixelated imaging detectors and/or gamma cameras configured in accordance with various embodiments mounted on a gantry. It should be noted that the imaging system may also be a multi-modality imaging system, such as an NM/CT imaging system. The imaging system 450, illustrated as a SPECT imaging system, generally includes a plurality of pixelated imaging detectors 452 and 454 (two are illustrated) mounted on a gantry 456. It should be noted that additional imaging detectors may be provided. The imaging detectors 452 and 454 are located at multiple positions (e.g., in an "L-mode" 90 degree configuration, as shown) with respect to a patient 458 in a bore 460 of the gantry 456. The patient 458 is supported on a patient table 462 such that radiation or imaging data specific to a structure of interest (e.g., the heart) within the patient 458 may be acquired. It should be noted that although the imaging detectors 452 and 454 are configured for movable operation (azimuthally around, radially in or out, rotatably around an axis, tiltably about a pivot, and the like) of the gantry 456, in some imaging systems, imaging detectors are fixedly coupled to the gantry 456 and in a stationary position, for example, in a PET imaging system (e.g., a ring of imaging detectors). It also should be noted that the imaging detectors 452 and 454 may be formed from different materials as described herein and provided in different configurations known in the art, such as flat or curved panels.

One or more collimators may be provided in front of the radiation detection face (317 in FIG. 3, but not shown in FIG. 4) of one or more of the imaging detectors 452 and 454. The imaging detectors 452 and 454 acquire a 2D image that may be defined by the x and y location of a pixel and the location of the imaging detectors 452 and 454. The radiation detection face (not shown) is directed towards, for example, the patient 458, which may be a human patient, animal, airport baggage, or the like.

A controller unit 464 may control the movement and positioning of the patient table 462 with respect to the imaging detectors 452 and 454 and the movement and positioning of the imaging detectors 452 and 454 with respect to the patient 458 to position the desired anatomy of the patient 458 within the fields of view (FOVs) of the imaging detectors 452 and 454, which may be performed prior to acquiring an image of the anatomy of interest. The controller unit 464 may have a table controller 465 and a gantry motor controller 467 that each may be automatically commanded by a processing unit 468, manually controlled by an operator, or a combination thereof. The table controller 465 may move the patient table 462 to position the patient 458 relative to the FOVs of the imaging detectors 452 and 454. Additionally, or optionally, the imaging detectors 452 and 454 may be moved, positioned or oriented relative to the patient 458 or rotated about the patient 458 under the control of the gantry motor controller 467.

The imaging data may be combined and reconstructed into an image, which may comprise 2D images, a 3D volume or a 3D volume over time (4D). A Data Acquisition System (DAS) 470 receives analog and/or digital electrical signal data produced by the imaging detectors 452 and 454 and decodes the data for subsequent processing as described in more detail herein. An image reconstruction processor 472 receives the data from the DAS 470 and reconstructs an image using any reconstruction process known in the art. A data storage device 474 may be provided to store data from the DAS 470 or reconstructed image data. An input device 476, such as a keyboard, mouse, touchscreen, or the like also may be provided to receive user inputs and a display 478 may be provided to display reconstructed images. A charge location determination module 480 may provide x and y position for each gamma photon interaction with the pixelated imaging detectors 452 and 454. In an embodiment, a depth-of-interaction z position may be determined.

In an embodiment, the imaging device may be installed in a location for security scanning. For example, the device may be in an airport security checkpoint, a baggage screening location, or the like. The device may comprise a plurality of x-ray sources and a plurality of pixelated photon detector arrays. In an embodiment, the imaging device may be permanently anchored, moveable, or completely portable. For example, an imaging device may be a hand-held device for use by first responders, security, or assessment teams. Other uses outside of a security setting are contemplated and are disclosed. As should be understood by one skilled in the art, both healthcare imaging and security screening are merely examples. Other possible applications for the techniques as described herein are possible and contemplated.

In an embodiment, the receiving equipment may contain sensors that are sensitive to subatomic particles or photons. The receiving equipment may record communication events, also referred to as interactions, on an array of sensors located in the receiving equipment. Each of the sensors in the array may be represented as a pixel in the final image. During the course of imaging, a photon or particle may strike one or more pixel detection units. In an embodiment, the signals received from the one or more pixel detection units may be used to separate unscattered and scattered photon emissions and to reconstruct an image using both. In a healthcare setting this may allow healthcare professionals to achieve better imaging in less time and with less radiolabel dose delivered to a patient which may result in better treatment plans and decrease medical costs, for example, better efficiency may be achieved and imaging sessions' durations may be reduced.

Those with skill in the art will recognize that the example of theranostic imaging with CZT gamma cameras has been described as one embodiment of the invention, which is intended for a broader range of applications. Thus, a photon imaging device has been illustrated by the example of a pixelated CZT gamma camera and a photon guide assembly has been illustrated by a corresponding gamma photon collimator assembly. The intended more general description of a photon imaging device may apply to photons of any wavelength or energy wherein a corresponding photon guide assembly may comprise an appropriate technology, for example, a glass lens assembly for an optical photon camera or a sapphire lens assembly for an infrared camera.

One embodiment of theranostic imaging applies to smart phones, tablets, and the like, that ubiquitously include a pixelated optical photography camera and display of the pixelated image. While various other circuits, circuitry or components may be utilized in information handling devices, with regard to smart phone and/or tablet circuitry 500, an example illustrated in FIG. 5 includes a system on a chip design found for example in tablet or other mobile computing platforms. Software and processor(s) are combined in a single chip 510. Processors comprise internal arithmetic units, registers, cache memory, busses, I/O ports, etc., as is well known in the art. Internal busses and the like depend on different vendors, but essentially all the peripheral devices (520) may attach to a single chip 510. The circuitry 500 combines the processor, memory control, and I/O controller hub all into a single chip 510. Also, systems 500 of this type do not typically use SATA or PCI or LPC. Common interfaces, for example, include SDIO and I2C.

There are power management chip(s) 530, e.g., a battery management unit, BMU, which manage power as supplied, for example, via a rechargeable battery 540, which may be recharged by a connection to a power source (not shown). In at least one design, a single chip, such as 510, is used to supply BIOS like functionality and DRAM memory.

System 500 typically includes one or more of a WWAN transceiver 550 and a WLAN transceiver 560 for connecting to various networks, such as telecommunications networks and wireless Internet devices, e.g., access points. Additionally, devices 520 are commonly included, e.g., an image sensor such as a camera. System 500 often includes a touch screen 570 for data input and display/rendering. System 500 also typically includes various memory devices, for example flash memory 580 and SDRAM 590. The components described herein may be adapted for use in an imaging device.

Figure 6:
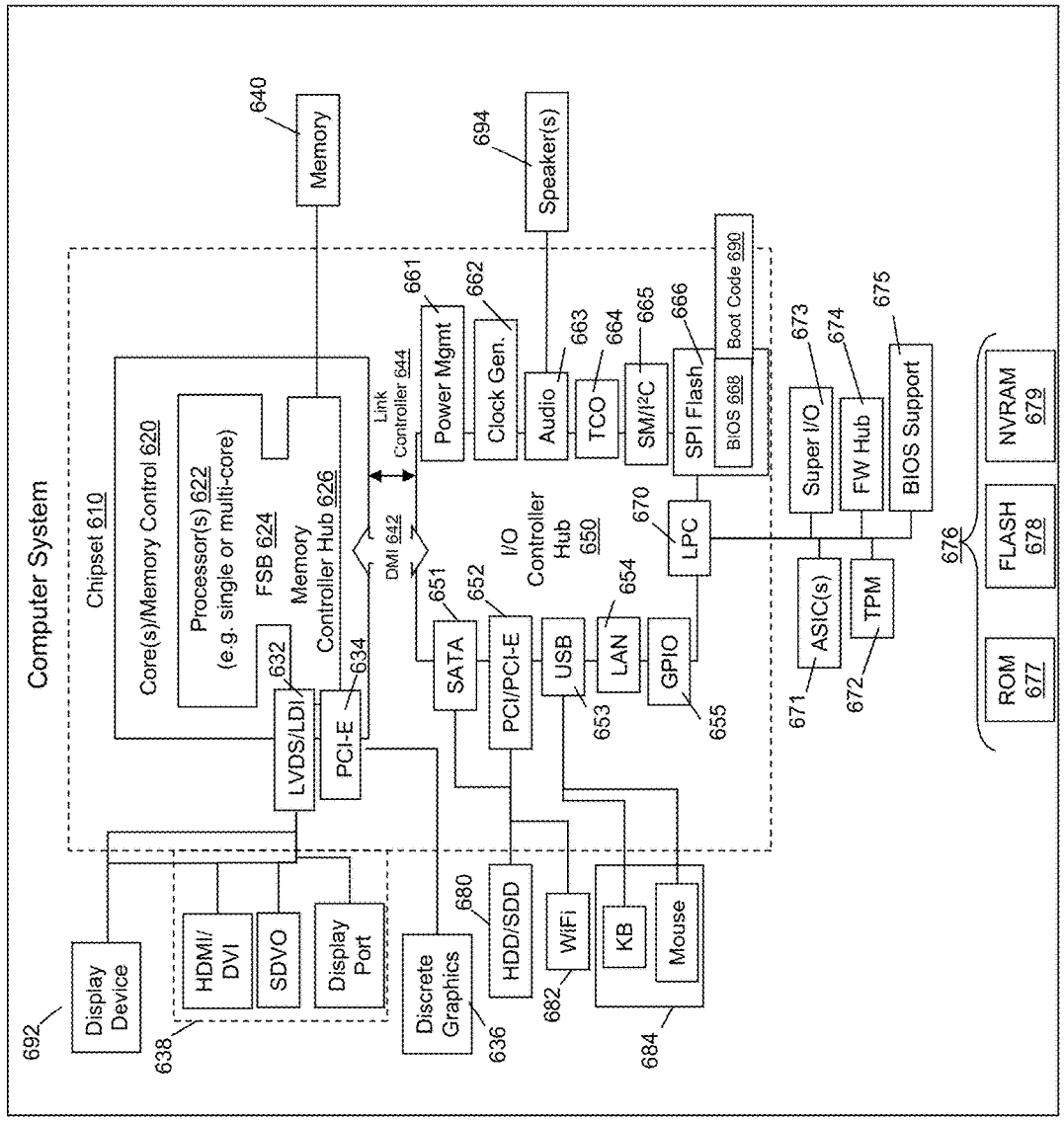
FIG. 6 illustrates another example of information handling device circuitry.

FIG. 6 depicts a block diagram of another example of information handling device circuits, circuitry or components. The example depicted in FIG. 6 may correspond to computing systems such as personal computers, laptop computers, or other devices that may embody theranostic imaging detected by the pixelated digital cameras such devices ubiquitously comprise. The scatter imaging may also be performed on the computing system when it is attached to a gamma camera, such as in a medical imaging application. As is apparent from the description herein, embodiments may include other features or only some of the features of the example illustrated in FIG. 6.

The example of FIG. 6 includes a so-called chipset 610 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 610 includes a core and memory control group 620 and an I/O controller hub 650 that exchanges information (for example, data, signals, commands, etc.) via a direct management interface (DMI) 642 or a link controller 644. In FIG. 6, the DMI 642 is a chip-to-chip interface (sometimes referred to as being a link between a "northbridge" and a "southbridge"). The core and memory control group 620 include one or more processors 622 (for example, single or multi-core) and a memory controller hub 626 that exchange information via a front side bus (FSB) 624; noting that components of the group 620 may be integrated in a chip that supplants the conventional "northbridge" style architecture. One or more processors 622 comprise internal arithmetic units, registers, cache memory, busses, I/O ports, etc., as is well known in the art.

In FIG. 6, the memory controller hub 626 interfaces with memory 640 (for example, to provide support for a type of RAM that may be referred to as "system memory" or "memory"). The memory controller hub 626 further includes a low voltage differential signaling (LVDS) interface 632 for a display device 692 (for example, a CRT, a flat panel, touch screen, etc.). A block 638 includes some technologies that may be supported via the LVDS interface 632 (for example, serial digital video, HDMI/DVI, display port). The memory controller hub 626 also includes a PCI-express interface (PCI-E) 634 that may support discrete graphics 636.

In FIG. 6, the I/O hub controller 650 includes a SATA interface 651 (for example, for HDDs, SDDs, etc., 680), a PCI-E interface 652 (for example, for wireless connections 682), a USB interface 653 (for example, for devices 684 such as a digitizer, keyboard, mice, cameras, phones, microphones, storage, other connected devices, etc.), a network interface 654 (for example, LAN), a GPIO interface 655, a LPC interface 670 (for ASICs 671, a TPM 672, a super I/O 673, a firmware hub 674, BIOS support 675 as well as various types of memory 676 such as ROM 677, Flash 678, and NVRAM 679), a power management interface 661, a clock generator interface 662, an audio interface 663 (for example, for speakers 694), a TCO interface 664, a system management bus interface 665, and SPI Flash 666, which can include BIOS 668 and boot code 690. The I/O hub controller 650 may include gigabit Ethernet support.

The system, upon power on, may be configured to execute boot code 690 for the BIOS 668, as stored within the SPI Flash 666, and thereafter processes data under the control of one or more operating systems and application software (for example, stored in system memory 640). An operating system may be stored in any of a variety of locations and accessed, for example, according to instructions of the BIOS 668. As described herein, a device may include fewer or more features than shown in the system of FIG. 6.

Figure 5:
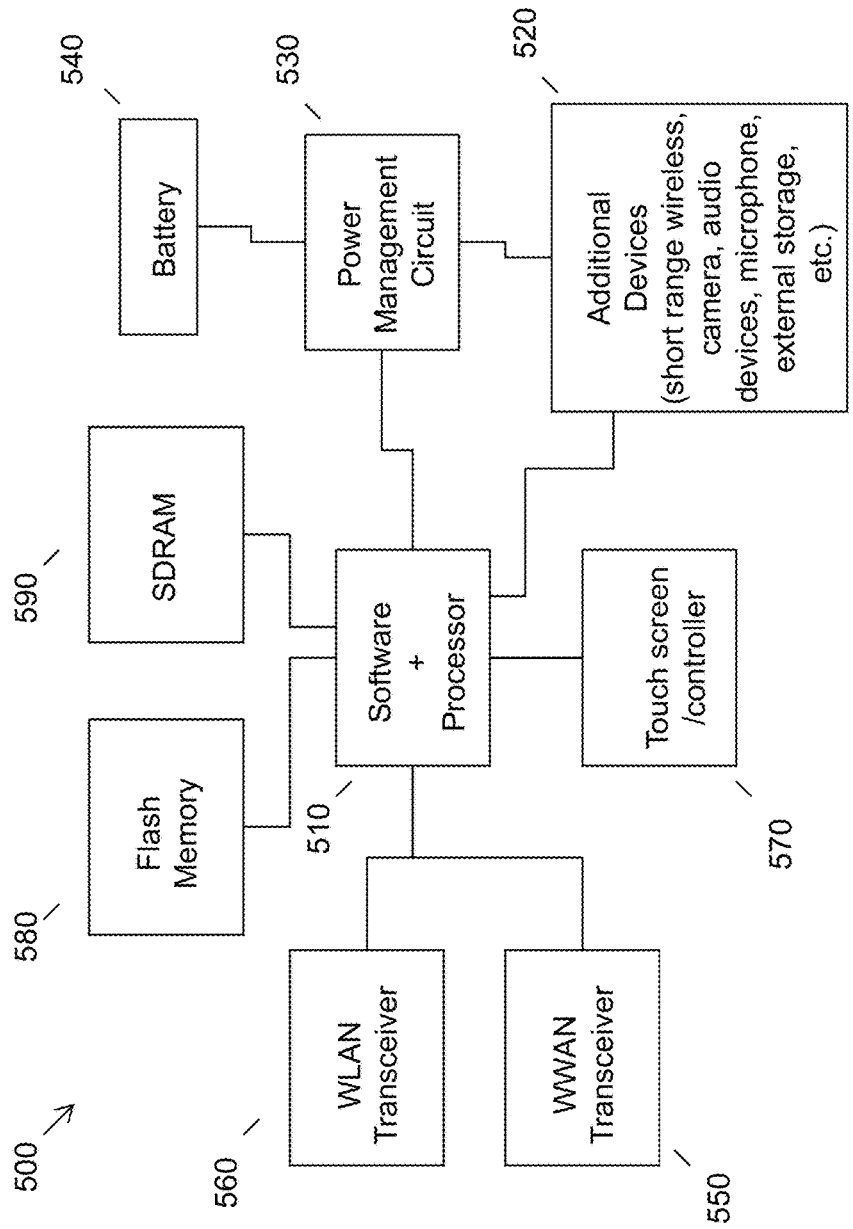
FIG. 5 illustrates an example of information handling device circuitry.

Information handling device circuitry, as for example outlined in FIG. 5 or FIG. 6, may be used in devices such as tablets, smart phones, personal computer devices generally, and/or electronic devices which users may use in or with systems as described herein. For example, the circuitry outlined in FIG. 5 may be implemented in a tablet or smart phone embodiment, whereas the circuitry outlined in FIG. 6 may be implemented in a personal computer embodiment.

The medical modality of SPECT has been used in this description of the invention for illustration. As will be appreciated by one skilled in the art, other medical, security, or non-destructive testing applications may also benefit from this invention. SPECT, PET, and gamma cameras are photon emission modalities; in contrast, photon transmission modalities such as x-ray CT, x-ray fluorescence, x-ray mammography, and x-ray radiography may use the method described to improve performance, including at least one of detection efficiency, image contrast, spatial resolution, and image quantitation.

As will be appreciated by one skilled in the art, various aspects may be embodied as a system, method or product device. Accordingly, aspects may take the form of an entirely hardware embodiment or an embodiment including software that may all generally be referred to herein as a "circuit," "module" or "system." Furthermore, aspects may take the form of a product device embodied in one or more device readable medium(s) having device readable program code embodied therewith.

It should be noted that the various functions described herein may be implemented using instructions stored on a readable storage medium device such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What we claim is:

1. A method for imaging photons, comprising:
receiving a dataset associated with a plurality of photon events, the photon events corresponding to photons interacting with a photon imaging device and each of the photon events having an incident path, wherein the photon imaging device comprises a photon guide assembly and a detector array;
the photon guide assembly comprising a plurality of photon guides positioned at an oblique angle with respect to the detector array, wherein the photon guides positioned at an oblique angle create a longer incident path of a photon event compared to a length of an incident path of a perpendicularly incident photon event; and
producing an oblique planar projection image of the plurality of photon events by processing the dataset and assigning a position of each photon event to a point of incidence on the detector array, wherein the assigning is based upon a measured depth of interaction along the longer incident path.

2. The method of claim 1, wherein the photon imaging device comprises a gamma camera.

3. The method of claim 1, wherein the detector array comprises a scintillator with at least one of: an array of photodetectors and an array of pixelated solid-state detectors.

4. The method of claim 3, wherein the detector array comprises the array of pixelated solid-state detectors; and
wherein the array of pixelated solid-state detectors comprises one of: cadmium-zinc-telluride (CdZnTe or CZT) crystals and cadmium-telluride (CdTe) crystals.

5. The method of claim 1, wherein the photon guide assembly comprises a collimator with at least one of: parallel slant holes, multiple pinholes, slanted coded aperture, and focused holes.

6. The method of claim 1, wherein the processing the dataset comprises applying pixel charge-sharing corrections.

7. The method of claim 1, wherein the processing the dataset comprises measuring a depth of interaction for each of the photon events.

8. The method of claim 1, wherein the processing the dataset comprises combining Compton scattering events.

9. The method of claim 1, further comprising reconstructing an image selected from the group consisting of: a stereo image and a tomographic image, using a plurality of the oblique planar projection images.

10. The method of claim 1, further comprising a camera selected from the group consisting of: an optical photon camera and an infrared camera.

11. A photon imaging device, comprising:
a photon guide assembly;
a detector array;
the photon guide assembly comprising a plurality of photon guides positioned at an oblique angle with respect to the detector array, wherein the photon guides positioned at an oblique angle create a longer incident path of a photon event compared to a length of an incident path of a perpendicularly incident photon event; and
a processor; and
a memory device that stores instructions executable by the processor to:
receive a dataset associated with a plurality of photon events, the photon events corresponding to photons interacting with the photon imaging device and each of the photon events having an incident path; and produce an oblique planar projection image of the plurality of photon events by processing the dataset and assigning a position of each photon event to a point of incidence on the detector array, wherein the assigning is based upon a measured depth of interaction along the longer incident path.

12. The device of claim 11, wherein the photon imaging device comprises a gamma camera.

13. The device of claim 11, wherein the detector array comprises a scintillator with at least one of: an array of photodetectors and an array of pixelated solid-state detectors.

14. The device of claim 13, wherein the detector array comprises the array of pixelated solid-state detectors; and
wherein the array of pixelated solid-state detectors comprises one of: cadmium-zinc-telluride (CdZnTe or CZT) crystals and cadmium-telluride (CdTe) crystals.

15. The device of claim 11, wherein the photon guide assembly comprises a collimator with at least one of: parallel slant holes, multiple pinholes, slanted coded aperture, and focused holes.

16. The device of claim 11, wherein the processing the dataset comprises applying pixel charge-sharing corrections.

17. The device of claim 11, wherein the processing the dataset comprises measuring a depth of interaction for each of the photon events.

18. The device of claim 11, wherein the processing the dataset comprises combining Compton scattering events.

19. The device of claim 11, further comprising reconstructing an image selected from the group consisting of: a stereo image and a tomographic image, using a plurality of the oblique planar projection images.

20. A product, comprising:
a storage device that stores code, the code being executable by a processor and comprising:
code that receives a dataset associated with a plurality of photon events, the photon events corresponding to photons interacting with a photon imaging device and each of the photon events having an incident path, wherein the photon imaging device comprises a photon guide assembly and a detector array;
the photon guide assembly comprising a plurality of photon guides positioned at an oblique angle with respect to the detector array, wherein the photon guides positioned at an oblique angle create a longer incident path of a photon event compared to a length of an incident path of a perpendicularly incident photon event; and
code that produces an oblique planar projection image of the plurality of photon events by processing the dataset and assigning a position of each photon event to a point of incidence on the detector array, wherein the assigning is based upon a measured depth of interaction along the longer incident path.

\* \* \* \* \*